United States Patent
Ide et al.

(10) Patent No.: US 6,501,943 B1
(45) Date of Patent: Dec. 31, 2002

(54) ADAPTIVE DIRECTIVITY TRANSMISSION DEVICE AND METHOD

(75) Inventors: Minako Ide, Yokohama (JP); Katsuhiko Hiramatsu, Yokosuka (JP); Keiji Takausaki, Yokohama (JP); Hideki Yukitomo, Yokohama (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 09/485,821

(22) PCT Filed: Jun. 14, 1999

(86) PCT No.: PCT/JP99/03162

§ 371 (c)(1),
(2), (4) Date: May 1, 2000

(87) PCT Pub. No.: WO99/67900

PCT Pub. Date: Dec. 29, 1999

(30) Foreign Application Priority Data

Jun. 24, 1998 (JP) .............................................. 10-177525

(51) Int. Cl.[7] .............................. H04B 1/00; H04B 7/00; H04B 1/02; H04B 7/02; H03C 7/02
(52) U.S. Cl. ......................... 455/101; 455/69; 455/562
(58) Field of Search ................................. 455/101, 562, 455/69

(56) References Cited

U.S. PATENT DOCUMENTS 5,999,826 A * 12/1999 Whinnett ..................... 455/562
6,192,256 B1 * 2/2001 Whinnett ..................... 455/562

FOREIGN PATENT DOCUMENTS

| EP | 0807989 | 11/1997 |
|---|---|---|
| JP | 2635503 | 7/1994 |
| JP | 9219615 | 8/1997 |
| JP | 9326630 | 12/1997 |
| JP | 10117162 | 5/1998 |
| JP | 118507 | 1/1999 |

OTHER PUBLICATIONS

PCT International Search Report dated Sep. 7, 1999.
Gregory G. Raleigh et al., "A Blind Adaptive Transmit Antenna Algorithm for Wireless Communication," IEEE, pp. 1494–1499, 1995.
Isamu Chiba et al., "Transmitting Null Beam Forming with Beam Space Adaptive Array Antennas," Technical of IEICE. A–P93–79 (Sep. 1993) w/English abstract.

* cited by examiner

Primary Examiner—William Cumming
(74) Attorney, Agent, or Firm—Stevens, Davis, Miller & Mosher, LLP

(57) ABSTRACT

A diversity receiver estimates a reception weight sing signals received at a plurality of antennas, a target pattern former forms a target radiation pattern based on the estimated reception weight, a transmission pattern former forms a transmission radiation pattern with a transmission weight using an arbitrary transmission weight as an initial value, a controller limits an angle range in which formation of the target radiation pattern and formation of the transmission radiation pattern are executed, an error detector detects an error between the target radiation pattern and the transmission radiation pattern, and subjects the detected error to logarithmic transformation, an updator updates the transmission weight so as to reduce the error subjected to logarithmic transformation, and a directivity former provides a transmission signal with a directivity according to the transmission radiation pattern formed using an updated transmission weight.

13 Claims, 19 Drawing Sheets

ANTENNA UPPER PLANE DIAGRAM

ADAPTIVE DIRECTIVITY TRANSMISSION DEVICE AND METHOD

TECHNICAL FIELD

The present invention relates to an adaptive-directivity transmission apparatus and adaptive-directivity transmission method that are applied to, for example, a base station apparatus in a mobile communication system.

BACKGROUND ART

An example of conventional adaptive-directivity transmission techniques is explained. The adaptive-directivity transmission is a technique that is studied on the premise that mainly a base station apparatus transmits a signal to a mobile station such as a portable telephone in a mobile communication system. Specifically, the base station first estimates a direction of a place where the mobile station is present based on reception weight information obtained in a reception circuit such as an adaptive array antenna provided in the base station. Then, the base station generates a directivity toward the estimated direction, and transmits a signal to the mobile station. Since the base station thus performs the adaptive-directivity transmission, it is possible to improve a reception gain in the mobile station, andfurthertoreduce interference to other mobile stations.

When this technique is used, in the case of a Time Division Duplex (hereinafter referred to as TDD) system in which transmission and reception carrier frequencies used in communications are same, it is possible to use a reception weight as a transmission weight without modifying the reception weight.

However, in the case of a Frequency Division Duplex (hereinafter referred to as FDD) system in which transmission and reception carrier frequencies used in communications are different, antenna intervals defined by a wavelength are different between a reception carrier frequency and a transmission carrier frequency. Therefore, it is not possible to obtain a directivity to be needed using the reception weight as the transmission with no modification performed. Accordingly, it is necessary to perform a correction on the reception weight due to a difference between the reception and transmission frequencies.

As methods for correcting the difference between the reception and transmission frequencies, there are following methods:

① Convert reception weights into transmission weights collectively using a predetermined conversion equation in the case where an arrival direction of a received signal is recognized in advance, or where an arrival direction of a received signal is estimated;

② obtain a transmission weight for forming a transmission radiation pattern (hereinafter referred to as "transmission pattern") with a directivity pointing only to an arrival direction of a desired signal, using a reception radiation pattern(hereinafter referred to as "reception pattern") ; and ③ obtain a transmission weight for minimizing an error between a reception pattern and a transmission pattern using a predetermined calculation equation with a negative feedback control. Thus, in the adaptive-directivity transmission in a conventional FDD system, the transmission weight is obtained from the reception weight with the predetermined equation, and then the appropriate transmission pattern is achieved.

However, in the above-described method ③ of collectively converting, in the case where the transmission pattern obtained with the transmission weights that are collectively converted is compared to the reception pattern, the patterns of a portion around a signal arrival direction are approximate in both radiation patterns, but a difference between the transmission pattern and the reception pattern becomes large in the portion away from the signal arrival direction as the portion goes away therefrom.

Further, in the above-described method ③ of obtaining a transmission weight for minimizing an error between a reception pattern and a transmission pattern using a predetermined calculation equation, the approximation is poor in a direction where an antenna directive gain is extremely suppressed, called null point. Furthermore, since it is necessary to examine a pattern error for all directions (0° to 360°) on the two-dimensional plane, this method requires a lot of time and calculation amounts by the time a value of the obtained transmission weight converges.

The null point is generated to suppress the interference signal, for example, when a base station receives the interference signal against a desired signal at the time the desired signal is received from mobile station A. Therefore, since it is considered that another base station B is present at the direction of the null point, in the case where the base station performs the adaptive-directivity transmission to mobile station A, if the base station suppresses a signal transmission level to the direction of the null point, the interference in mobile station B is thereby reduced. Accordingly, it is important, for the improvement of the system performance, to obtain the transmission pattern of which the null point is approximated to that in the reception pattern.

DISCLOSURE OF THE INVENTION

An object of the present invention is to provide an adaptive-directivity transmission apparatus and adaptive-directivity transmission method which can improve the approximation of a transmission pattern and reception pattern at a directive antenna gain suppressed direction, while being capable of reducing a time and calculation amount required by the time a value of transmission weight converges, in the case of using the method for obtaining a transmission weight that minimizes an error between the transmission pattern and reception pattern with a predetermined calculation equation.

To achieve the above object, the adaptive-directivity transmission apparatus according to the present invention subjects the error between the transmission pattern and reception pattern to logarithmic transformation, and obtains a transmission weight that minimizes the error subjected to the logarithmic transformation. The directive antenna gain is generally represented using dB as a unit. The directive antenna gain at a null point is normally smaller than the maximum value of the directive antenna gain by 30 dB to 40 dB. Otherwise, the gain at the null point is $1/1,000$ to $1/10,000$ the maximum value in the true value. Accordingly, since the error between the transmission pattern and reception pattern around the null point becomes an extremely small value,in the adaptive-directivity transmission apparatus according to the present invention the error is calculated using dB, not the true value. In the adaptive-directivity transmission apparatus according to the present invention it is thus possible to improve the approximation of the transmission pattern and reception pattern at the directive antenna gain suppressed direction.

Further, to achieve the above object, the adaptive-directivity transmission apparatus of the present invention limits a range in which the error between the transmission pattern and reception pattern is searched to a predetermined range. In the adaptive-directivity transmission apparatus according to the present invention it is thereby possible to reduce the time and calculation amount required by the time the value of transmission weight converges.

BEST MODE FOR CARRYING OUT THE INVENTION

Embodiments of an adaptive-directivity transmission apparatus and adaptive-directivity transmission method of the present invention are explained below specifically using drawings.

First Embodiment

Figure 1:
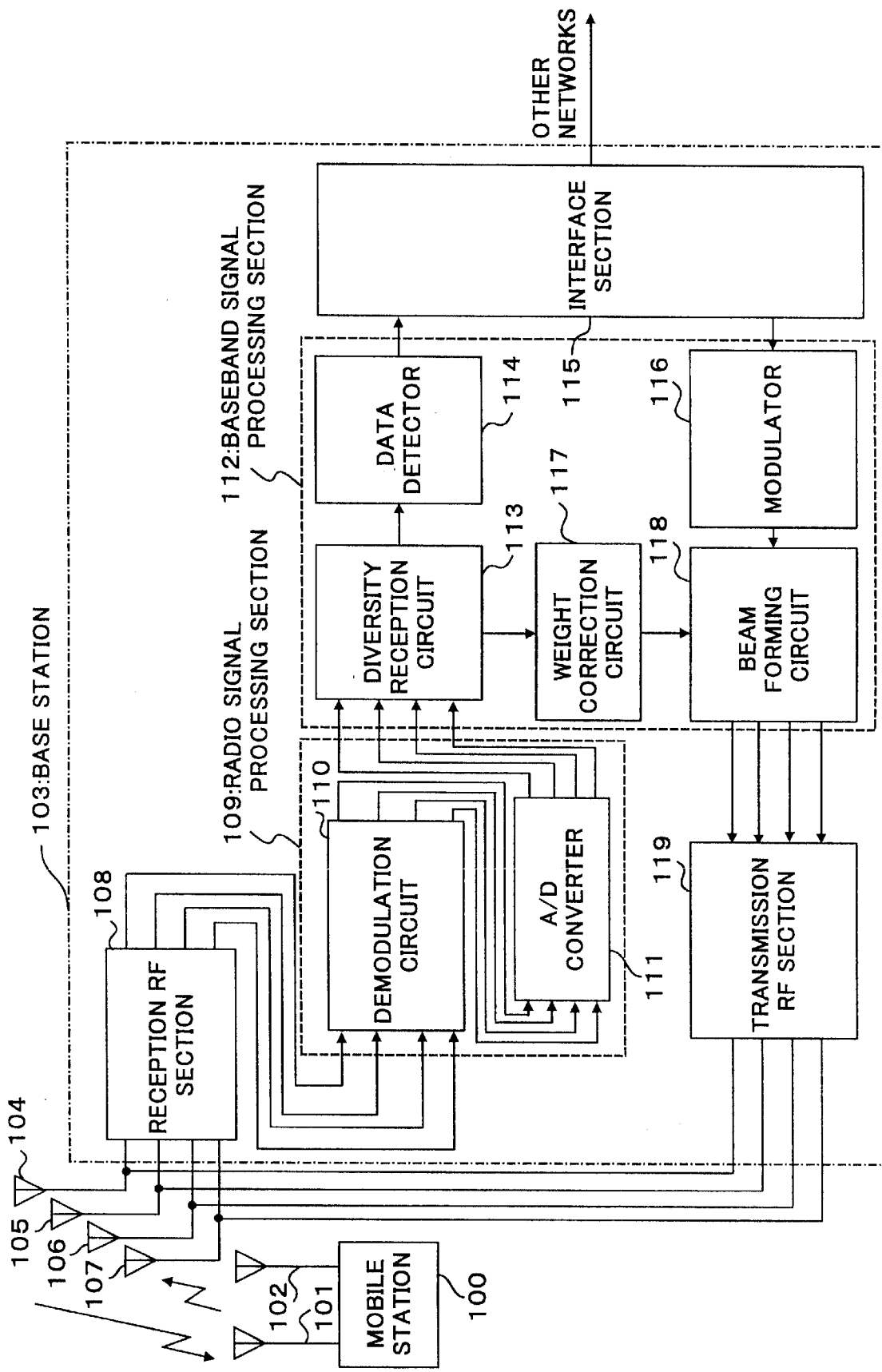
FIG. 1 is a block diagram illustrating a configuration of an adaptive-directivity transmission apparatus according to a first embodiment of the present invention.

FIG. 1 is a block diagram illustrating a configuration of an adaptive-directivity transmission apparatus according to the first embodiment of the present invention.

In FIG. 1, 100 is a mobile station with two antennas 101 and 102 (for example, car telephone), and 103 is a base station which performs radio communications with mobile station 100. Base station 103 has the function as a delay apparatus for other network systems, further has a plurality (in this example, 4) of antennas 104 to 107, and using the antenna group, transmits and receives radio signals to/from antennas 101 and 102 of mobile station 100.

Four analog signals received at antennas 104 to 107 of base station 103 are converted into intermediate-frequency signals and amplified in reception RF section 108, and then inputted to radio signal processing section 109, respectively.

Four analog signals inputted to radio signal processing section 109 are subjected to quadrature demodulation in demodulation circuit 110. The demodulated signals are converted into digital signals in A/D converter 111, and then inputted to baseband signal processing section 112.

Four digital signals that are inputted to baseband signal processing 112 are weighted in diversity reception circuit 113 to be combined, and then decoded in data detector 114. The decoded signal is transmitted to another network system via interface section 115.

On the other hand, a signal inputted to baseband signal processing section 112 via interface section 115 from another network system is modulated in modulator 116, and then inputted to beam forming circuit 118.

In beam forming circuit 118, the modulated signals are provided with the directivity using transmission weights which are obtained in weight correction circuit 117 using values of reception weights obtained in diversity reception circuit 113, and thus four transmission signals are generated. Four transmission signals are converted into signals with the radio carrier frequency in transmission RF section 119, and then transmitted respectively from antennas 104 to 107 to mobile station 100.

Figure 2:
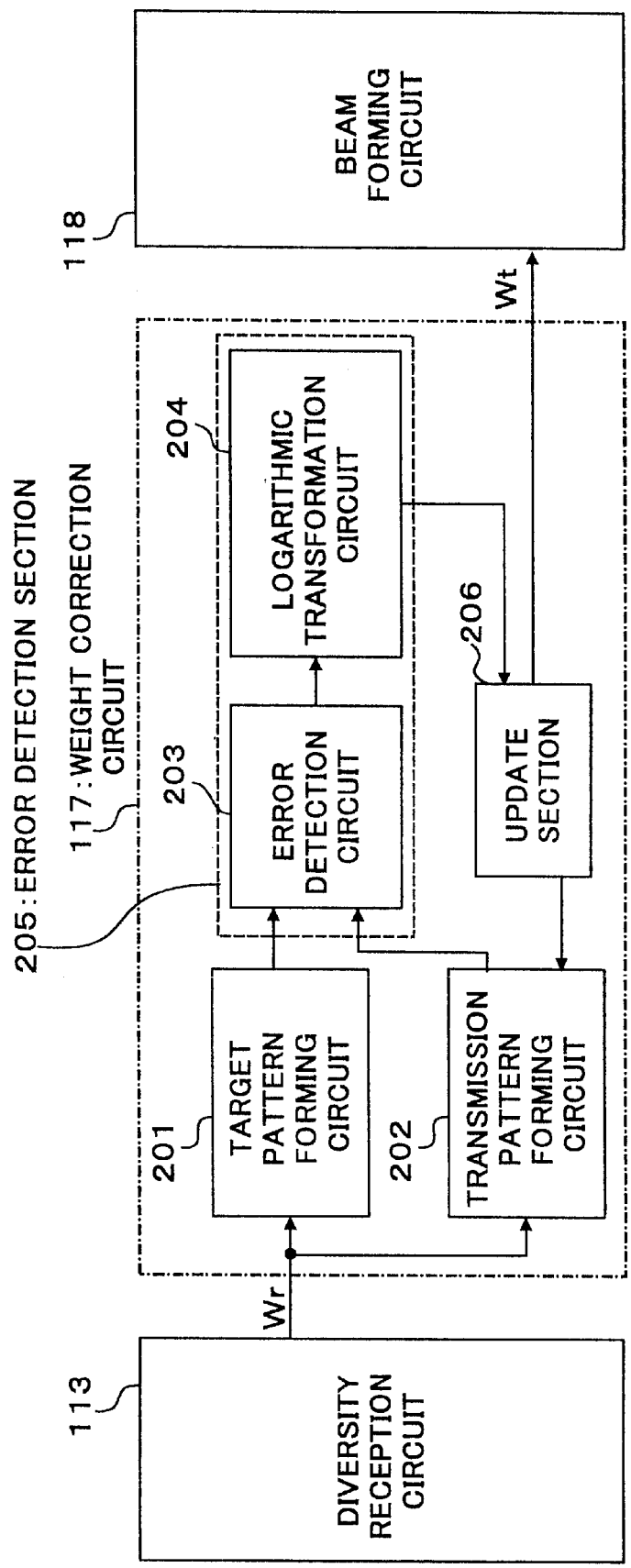
FIG. 2 is a block diagram illustrating a configuration of a weight correction circuit in the adaptive-directivity transmission apparatus according to the above first embodiment.

FIG. 2 is a block diagram illustrating a configuration of weight correction circuit 117. As illustrated in FIG. 2, weight correction circuit 117 is comprised of target radiation pattern (hereinafter referred to as "target pattern") forming circuit 201 which forms a target pattern based on reception weight Wr obtained in diversity reception circuit 113, transmission pattern forming circuit 202 which forms a transmission pattern using transmission weight Wt, error detection section 205 comprised of error detection circuit 203 which detects an error between the target pattern and a transmission pattern and logarithmic transformation circuit 204 which subjects the detected error to logarithmic transformation, and update section 206 which updates transmission weight Wt so as to reduce the error.

Figure 3A:
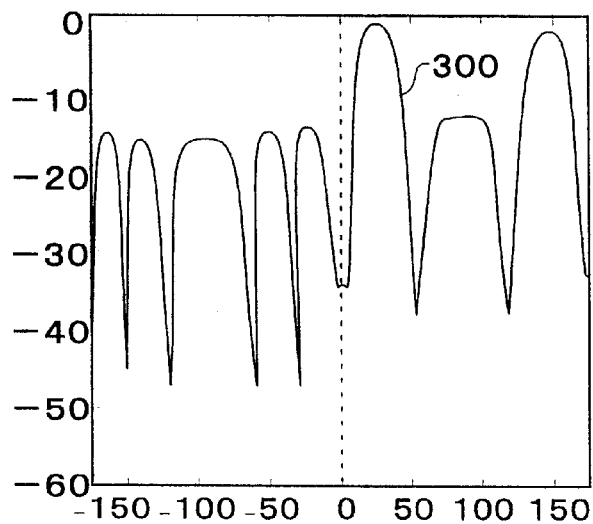
FIG. 3A, FIG. 3B and FIG. 3C are radiation pattern diagrams for use in the above first embodiment.
Figure 3B:
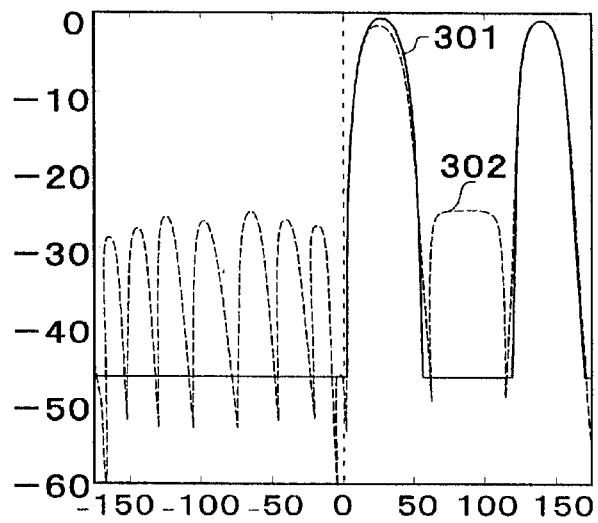
Figure 3C:
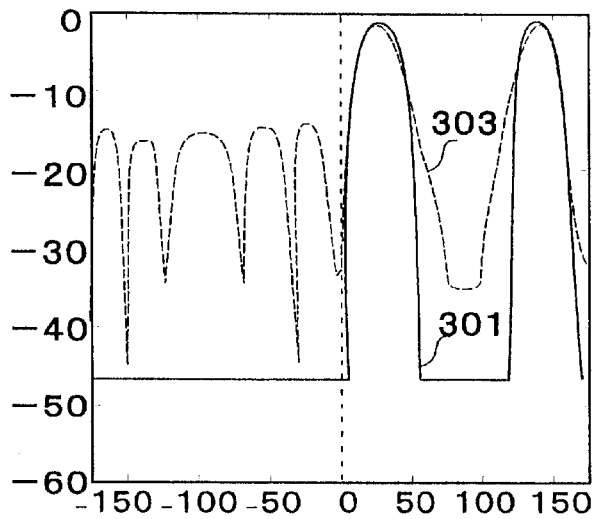

FIG. 3 is a radiation pattern diagram for use in the first embodiment. In FIG. 3, FIG. 3(a), FIG. 3(b) and FIG. 3(c) respectively illustrate reception pattern 300, target pattern 301 and transmission pattern 302 subjected to transmission weight correction according to the first embodiment, and target pattern 301 and transmission pattern 303 subjected to transmission weight correction according to the conventional method.

Operations in weight correction circuit 117 are explained below using FIG. 1 to FIG. 3.

When reception weight Wr is estimated in diversity reception circuit 113 using arrival radio signals from mobile station 100, target pattern forming circuit 201 forms reception pattern 300 with reception weight Wr. Further, target pattern forming circuit 201 converts reception pattern 300 into target pattern 301 according to an arbitrary algorithm. Then, target pattern 301 is outputted to error detection section 205. In addition, in the first embodiment, as an example of the algorithms for converting reception pattern 300 into target pattern 301, used is the conversion method of converting all directions except main lobes into directive antenna gain suppressed directions.

On the other hand, transmission pattern forming circuit 202 forms transmission pattern 302 using reception weight Wr as an initial value, and outputs transmission pattern 302 to error detection section 205.

In error detection section 205, error detection circuit 203 first detects an error between target pattern 301 and transmission pattern 302. Then, logarithmic transformation circuit 204 subjects the error amount to logarithmic transformation, and outputs the logarithmic error amount to update section 206.

Update section 206 updates transmission weight Wt so as to reduce the error based on the logarithmic error amount according to a predetermined algorithm.

As described above, weight correction circuit 117 executes a series of processing of formation of transmission pattern, error detection and update of transmission weight Wt the predetermined number of times, or until the error converges on a constant value, thereby forming transmission pattern 302.

Thus, according to the first embodiment, since weight correction circuit 117 subjects the error amount to logarithmic transformation, it is possible to use an error at a direction where the directive antenna gain is small also effectively in updating transmission weight Wt. As a result, it is possible to improve the approximation at the directive antenna gain suppressed direction.

In addition, in the first embodiment, although reception weight Wr is used as the initial value of transmission weight Wt, it may be possible to use any other value. Further, it may be possible to use reception pattern 300 as the target pattern.

Second Embodiment

Figure 4:
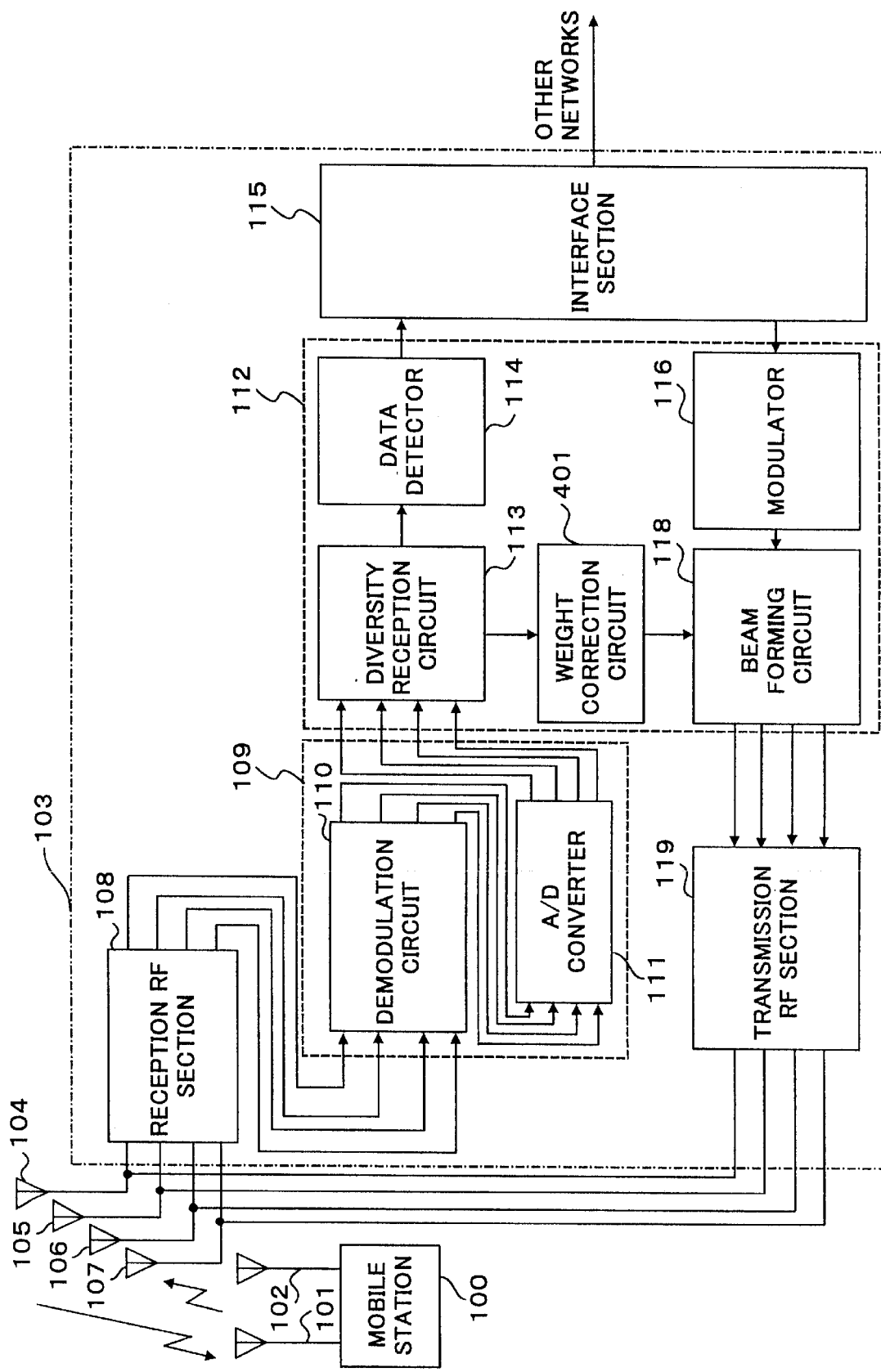
FIG. 4 is a block diagram illustrating a configuration of an adaptive-directivity transmission apparatus according to a second embodiment of the present invention.

FIG. 4 is a block diagram illustrating a configuration of an adaptive-directivity transmission apparatus according to the second embodiment of the present invention. In addition, in the second embodiment illustrated in FIG. 4, each section with the same configuration as that in the first embodiment illustrated in FIG. 1 is given the same symbol to omit explanations thereof.

Figure 5:
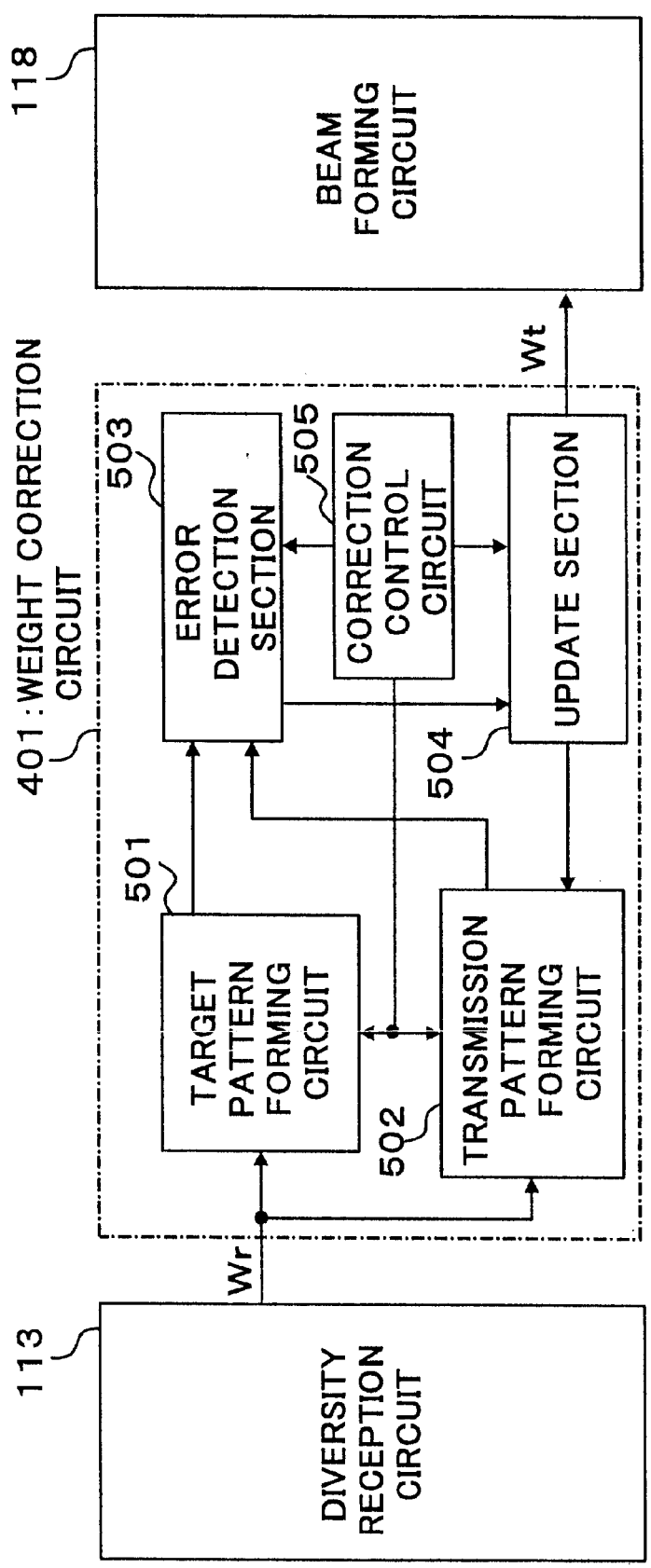
FIG. 5 is a block diagram illustrating a configuration of a weight correction circuit in the adaptive-directivity transmission apparatus according to the above second embodiment.

The different point of the second embodiment illustrated in FIG. 4 from the first embodiment illustrated in FIG. 1 is a configuration of a weight correction circuit indicated with symbol 401 in FIG. 4. FIG. 5 is a block diagram illustrating a configuration of weight correction circuit 401.

Weight correction circuit 401 illustrated in FIG. 5 is comprised of target pattern forming circuit 501 which forms a target pattern based on reception weight Wr obtained in diversity reception circuit 113, transmission pattern forming circuit 502 which forms a transmission pattern using transmission weight Wt, error detection section 503 which detects an error between the target pattern and the transmission pattern, update section 504 which updates transmission weight Wt so as to reduce the error, and correction control circuit 505 which performs the control of an error detection range and update range of transmission weight Wt.

Figure 6:
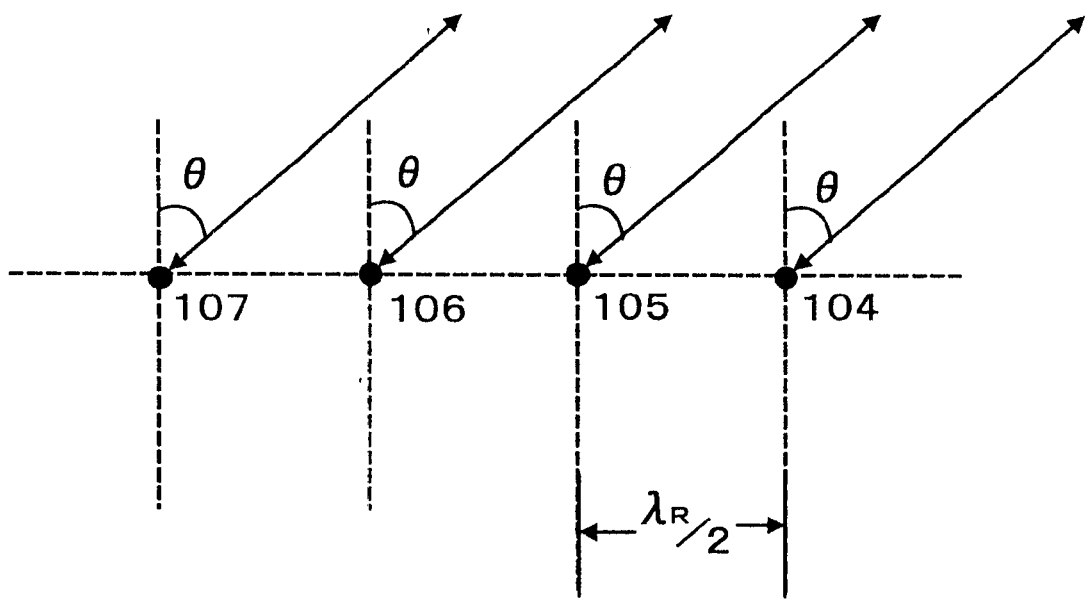
FIG. 6 is a diagram illustrating an arrangement of antennas of a base station, and settings of radio signal arrival angles and radio signal transmission angles to respective antennas, in the adaptive-directivity transmission apparatus of the above second embodiment.

FIG. 6 is a diagram illustrating an arrangement of antennas of a base station, and settings of radio signal arrival angles and radio signal transmission angles to respective antennas, in the adaptive-directivity transmission apparatus of the second embodiment.

Figure 7:
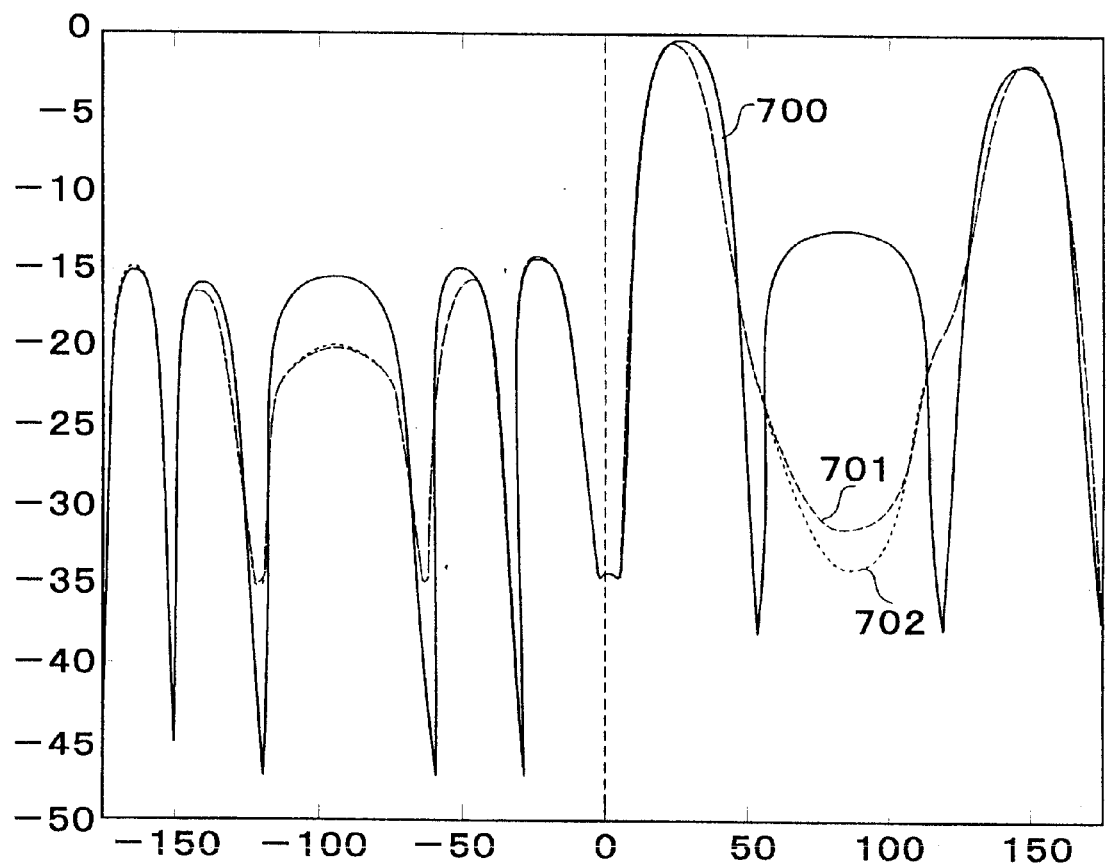
FIG. 7 is a radiation pattern diagram for use in the above second embodiment.

FIG. 7 is a radiation pattern diagram for use in the second embodiment. In FIG. 7, 700 is a target pattern, 701 is a transmission pattern subjected to transmission weight correction according to the second embodiment, and 702 is a transmission pattern subjected to transmission weight correction according to the conventional method with all directions used as the object range. In addition, it is assumed in this embodiment to use the reception pattern as target pattern 700.

Characteristic operations of the second embodiment are explained below using FIG. 5 to FIG. 7.

In the second embodiment, based on a signal vector with same levels in all the direction (steering vector) that can be obtained from incident angle $\theta$ of a received signal being incident upon each of antennas 104 to 107 of which the arrangement is preset, an angle range is obtained in which a radiation pattern forms mirror images, and the range for the update or other processing on transmission weight Wt performed in correction control circuit 505 is limited to a predetermined angle range, thereby making it possible to reduce the calculation amount.

The specific explanation is described below. Steering vector $X(\theta)$ obtained from the antenna arrangement illustrated in FIG. 6 is expressed with the following equation (1).

$$X(\theta)=[\exp\{j\pi(\sin\theta)\}, \exp\{j2\pi(\sin\theta)\}, \exp\{j3\pi(\sin\theta)\}, \exp\{j4\pi(\sin\theta)\}] \qquad (1)$$

It is understood that $X(\theta)$ forms mirror images along: the 90° line as a center from the definition of trigonometric function sine $\theta$. Accordingly, since reception weight Wr adopts a single value and the reception pattern forms mirror images in ranges of $-90°\leq\theta\leq90°$ and $90°\leq\theta\leq270°$, the range of $-90°\leq\theta\leq90°$ is preset in correction control circuit 505 as an angle range in which the error detection and update of transmission weight Wt are executed.

In weight correction circuit 401, target pattern forming circuit 501 controlled by correction control circuit 505 forms target pattern 700 in the range of $-90°\leq\theta\leq90°$ with reception weight Wr.

On the other hand, transmission pattern forming circuit 502 forms transmission pattern 701 using reception weight Wr as an initial value. Then, error detection section 503 detects an error between target pattern 700 and transmission pattern 701. Based on the detected error, update section 504 updates transmission weight Wt so as to reduce the error according to the predetermined algorithm. At this point, correction control circuit 505 controls the angle range, in which the formation of transmission pattern 701, the error detection, and the update of transmission weight Wt are executed, at $-90°\leq\theta\leq90°$.

As described above, weight correction circuit 401 executes a series of processing of the formation of transmission pattern 701, error detection, and update of transmission weight Wt in the predetermined angle range ($-90°\leq\theta\leq90°$) the predetermined number of times, or until the error converges on a constant.

Thus, according to the second embodiment, since the range in which the series of processing such as the update of transmission weight Wt is executed is limited to the predetermined angle range ($-90°\leq\theta\leq90°$), it is possible to reduce the calculation amount required for the series of processing, while holding the correction accuracy with almost the same degree, as compared to the case where the series of processing is executed with all directions (all-angle range) used as the object range.

In addition, in the second embodiment, although the reception pattern is used as the target pattern, it may be possible to form a target pattern using reception weight Wr with the other algorithm. Further, although reception weight Wr is used as an initial value of transmission weight Wt, it may be possible to use the other arbitrary values.

Third Embodiment

Figure 8:
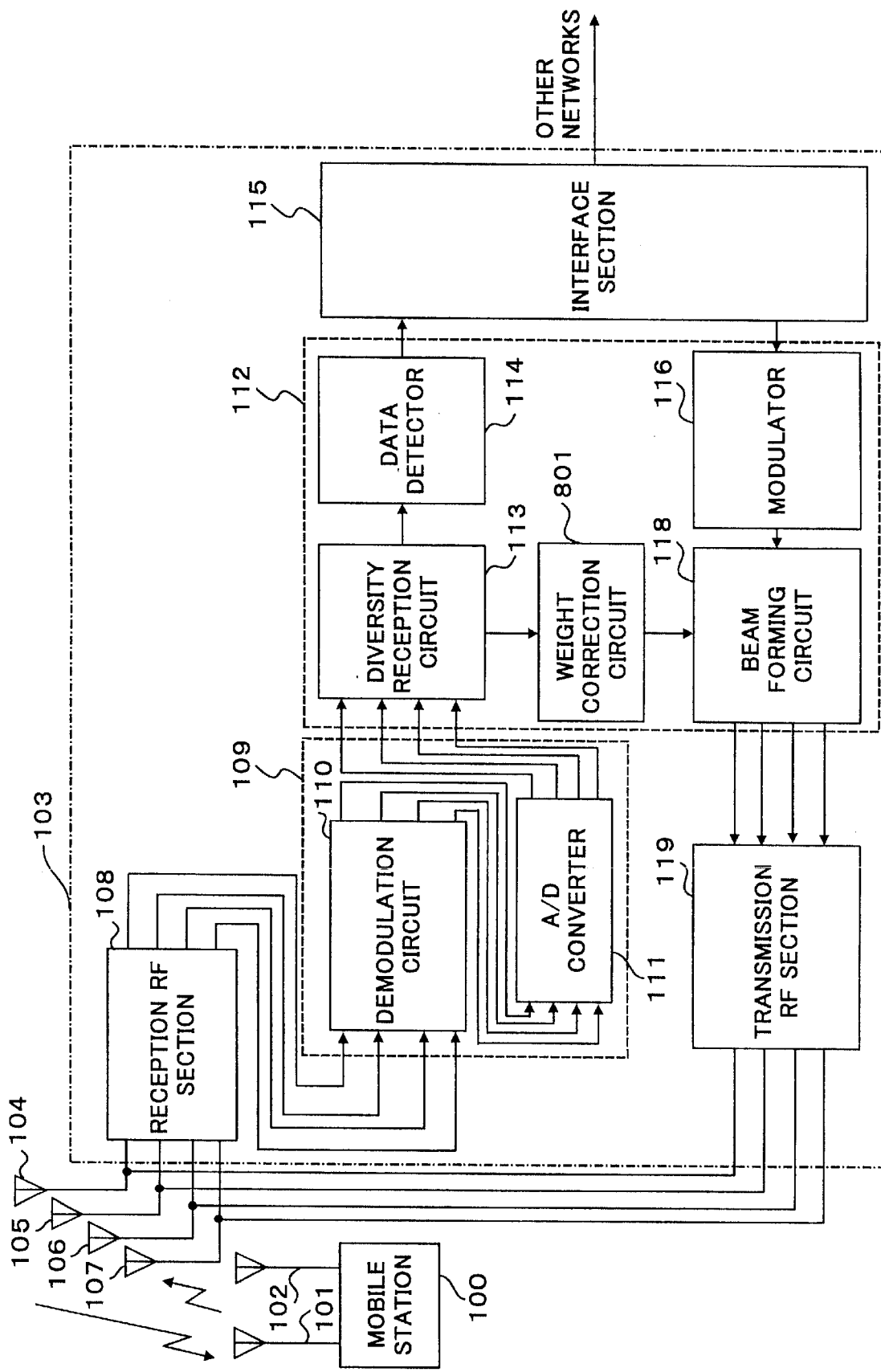
FIG. 8 is a block diagram illustrating a configuration of an adaptive-directivity transmission apparatus according to a third embodiment of the present invention.

FIG. 8 is a block diagram illustrating a configuration of an adaptive-directivity transmission apparatus according to the third embodiment of the present invention. In addition, in the third embodiment illustrated in FIG. 8, each section with the same configuration as that in the second embodiment illustrated in FIG. 4 is given the same symbol to omit explanations thereof.

The different points of the third embodiment illustrated in FIG. 8 from the second embodiment illustrated in FIG. 4 are that antennas 104 to 107 are sector antennas, and that weight correction circuit 801 limits an angle range for the weight correction processing corresponding to the directivities of sector antennas 104 to 107.

Figure 9:
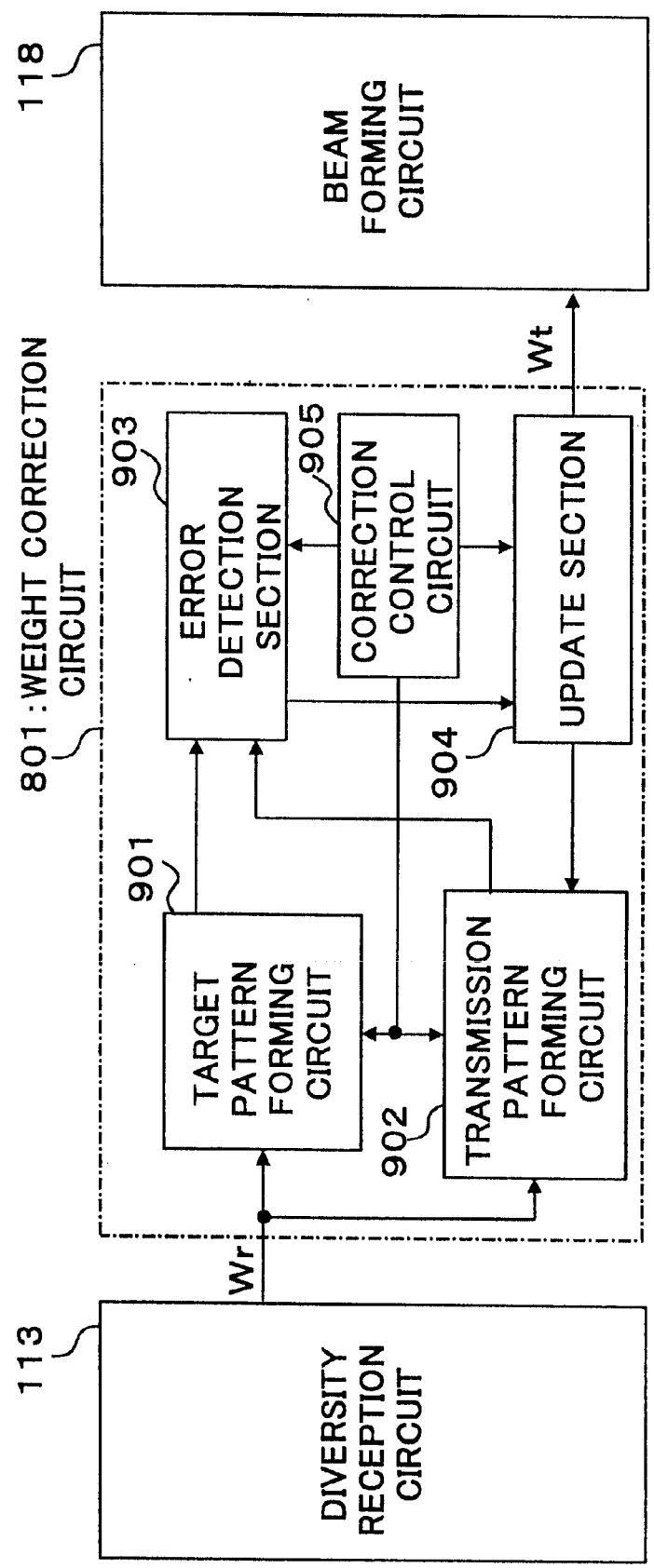
FIG. 9 is a block diagram illustrating a configuration of a weight correction circuit in the adaptive-directivity transmission apparatus according to the above third embodiment.

FIG. 9 is a block diagram illustrating a configuration of weight correction circuit 801. In addition, FIG. 10 is a diagram illustrating object ranges and directivities of sector antennas 104 to 107.

Figure 11:
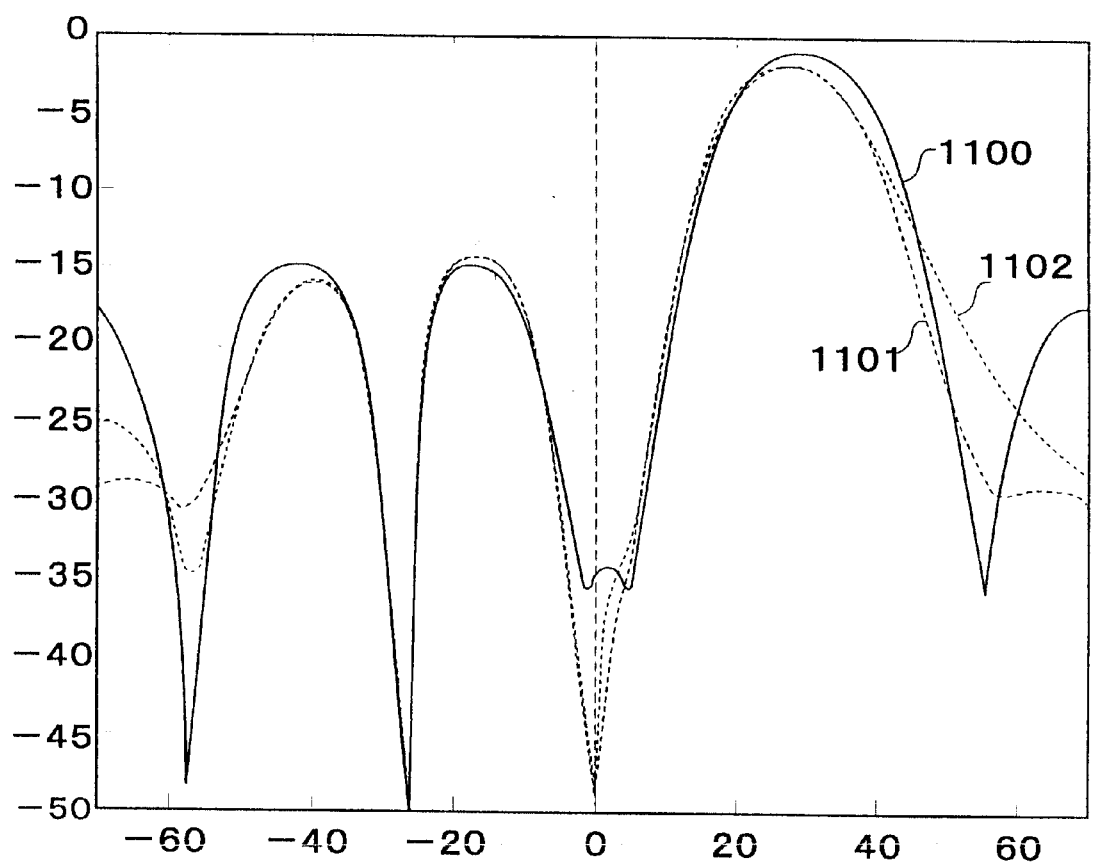
FIG. 11 is a radiation pattern diagram for use in the above third embodiment.

Further, FIG. 11 is a radiation pattern diagram for use in the third embodiment. In FIG. 11, 1100 is a target pattern, 1101 is a transmission pattern subjected to transmission weight correction according to the third embodiment, and 1102 is a transmission pattern subjected to transmission weight correction according to the conventional method with all directions used as the object range. In addition, it is assumed in this embodiment to use the reception pattern as target pattern 1100.

Figure 10:
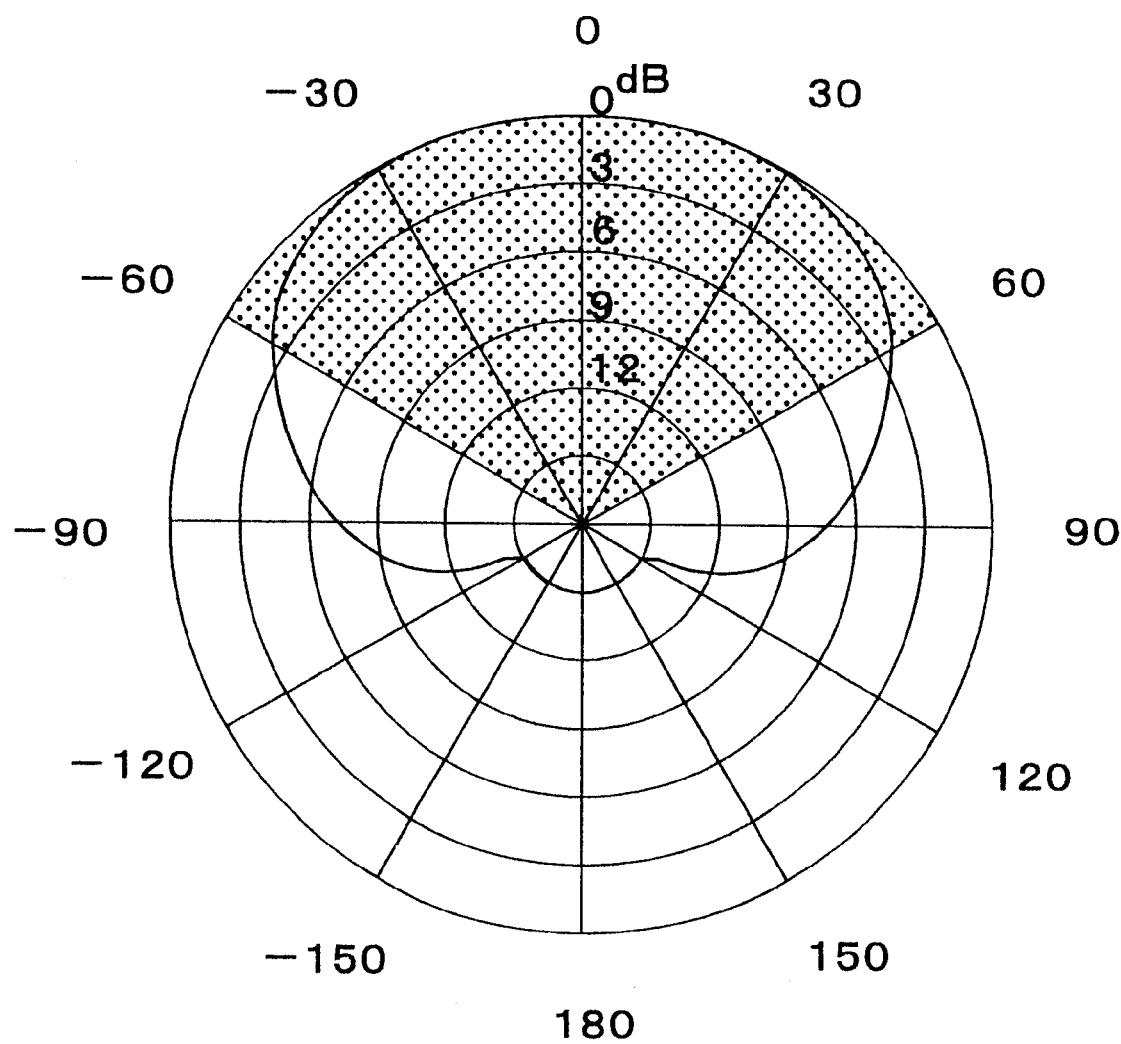
FIG. 10 is a diagram illustrating object ranges and directivities of sector antennas in the third embodiment of the present invention.

As described above, since the third embodiment has the feature that the angle range for the weight correction processing is limited corresponding to the directivities of sector antennas 104 to 107, it is assumed that as the angle range in which the error detection and update of weight are executed, $-70° \leq \theta \leq 70°$ is preset in correction control circuit 905 illustrated in FIG. 9 based on the antenna directivity illustrated in FIG. 10.

In weight correction circuit 801, target pattern forming circuit 901 controlled by correction control circuit 905 forms target pattern 1100 in the range of $-70° \leq \theta 70°$ with reception weight Wr.

On the other hand, transmission pattern forming circuit 902 forms transmission pattern 1101 using reception weight Wr as an initial value. Then, error detection section 903 detects an error between target pattern 1100 and transmission pattern 1101. Based on the detected error, update section 904 updates transmission weight Wt so as to reduce the error according to the predetermined algorithm. At this point, correction control circuit 905 controls the angle range, in which the formation of transmission pattern 1101, error detection, and update of transmission weight Wt are executed, at $-70° \leq \theta \leq 70°$.

As described above, weight correction circuit 801 executes a series of processing of the formation of transmission pattern 1101, error detection, and update of transmission weight Wt in the predetermined angle range ($-70°\theta \leq 70°$) the predetermined number of times, or until the error converges on a constant.

Thus, according to the third embodiment, it is possible to further reduce the calculation amount without the correction accuracy deteriorates as compared to the second embodiment.

In addition, in the third embodiment, although the reception pattern is used as the target pattern, it may be possible to form a target pattern using reception weight Wr with the other algorithm. Further, although reception weight Wr is used as an initial value of transmission weight Wt, it may be possible to use other arbitrary values.

Fourth Embodiment

Figure 12:
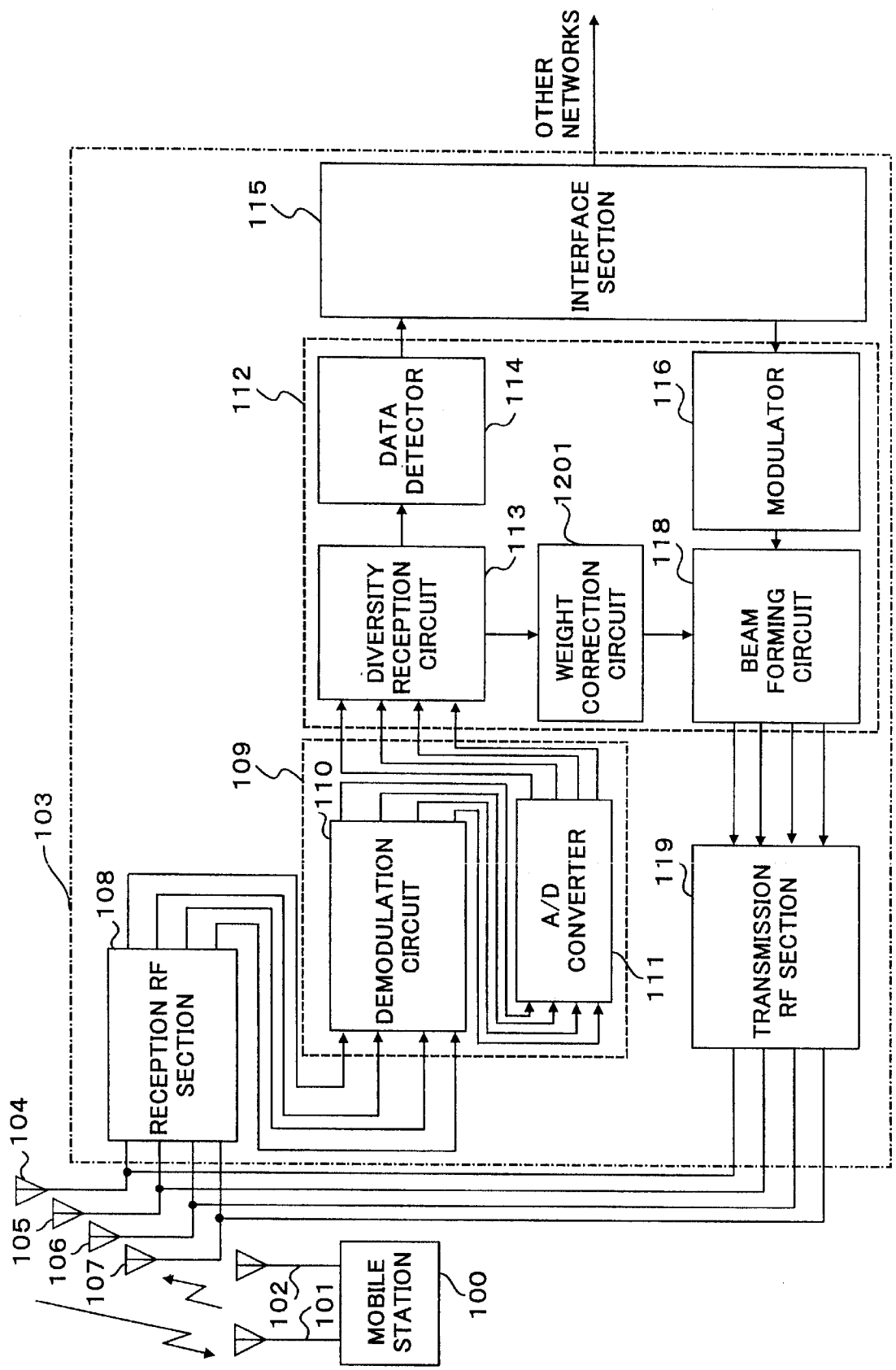
FIG. 12 is a block diagram illustrating a configuration of an adaptive-directivity transmission apparatus according to a fourth embodiment of the present invention.

FIG. 12 is a block diagram illustrating a configuration of an adaptive-directivity transmission apparatus according to the fourth embodiment of the present invention. In addition, in the fourth embodiment illustrated in FIG. 12, each section with the same configuration as that in the third embodiment illustrated in FIG. 8 is given the same symbol to omit explanations thereof.

The different point of the fourth embodiment illustrated in FIG. 12 from the third embodiment illustrated in FIG. 8 is that in the case where an angle range for the weight correction processing is limited to an arbitrary range by weight correction circuit 1201, the series of processing of the formation of transmission pattern, error detection and update of transmission weight is executed to the end point of the limited angle range, and repeated again to another end point of the limited angle range. Thus, the processing is executed in the limited angle range forth and back alternately, i.e., in the mutually reverse directions.

Figure 13:
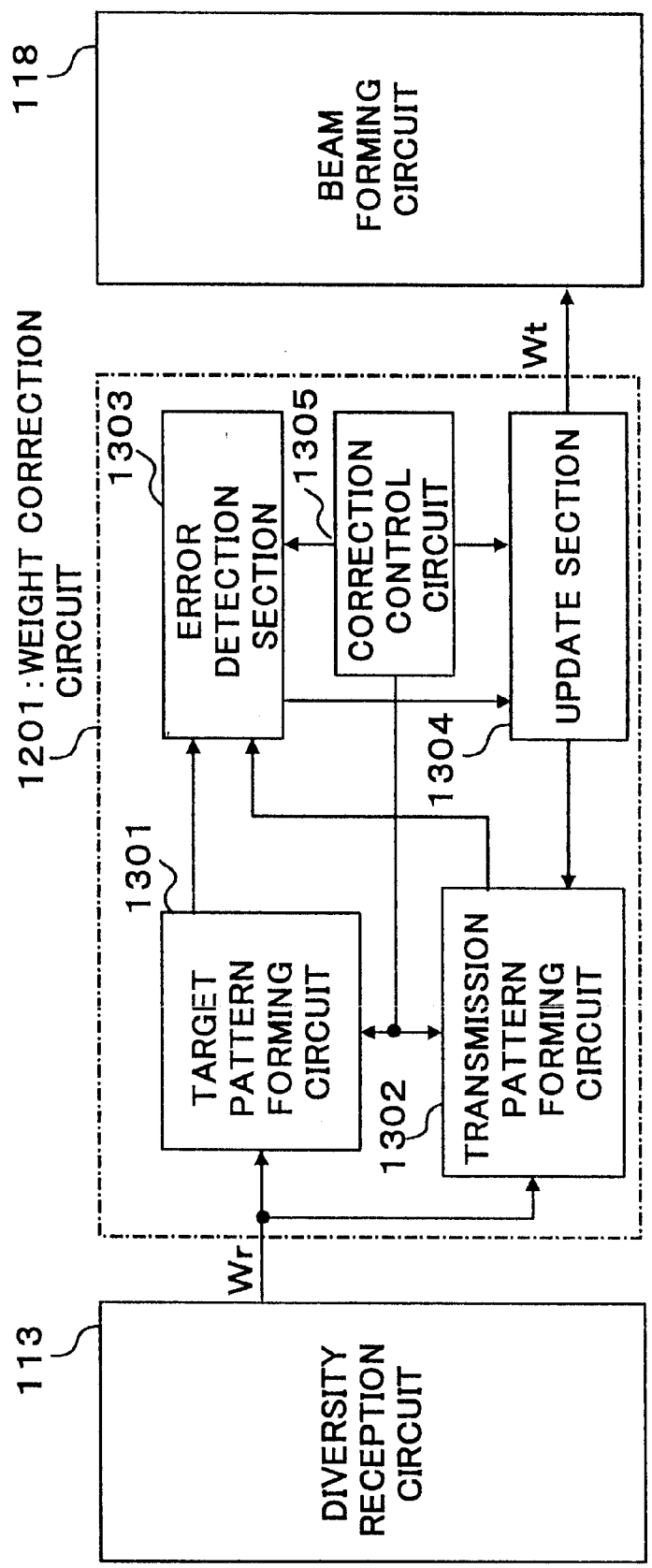
FIG. 13 is a block diagram illustrating a configuration of a weight correction circuit in the adaptive-directivity transmission apparatus according to the above fourth embodiment.

FIG. 13 is a block diagram illustrating a configuration of weight correction circuit 1201. As illustrated in FIG. 13, weight correction circuit 1201 is comprised of target pattern forming circuit 1301 which forms a target pattern based on reception weight Wr obtained in diversity reception circuit 113, transmission pattern forming circuit 1302 which forms a transmission pattern using transmission weight Wt, error detection section 1303 which detects an error between the target pattern and the transmission pattern, update section 1304 which updates transmission weight Wt so as to reduce the error, and correction control circuit 1305 which performs the control of an error detection range, and update range and update direction of transmission weight Wt.

Figure 14:
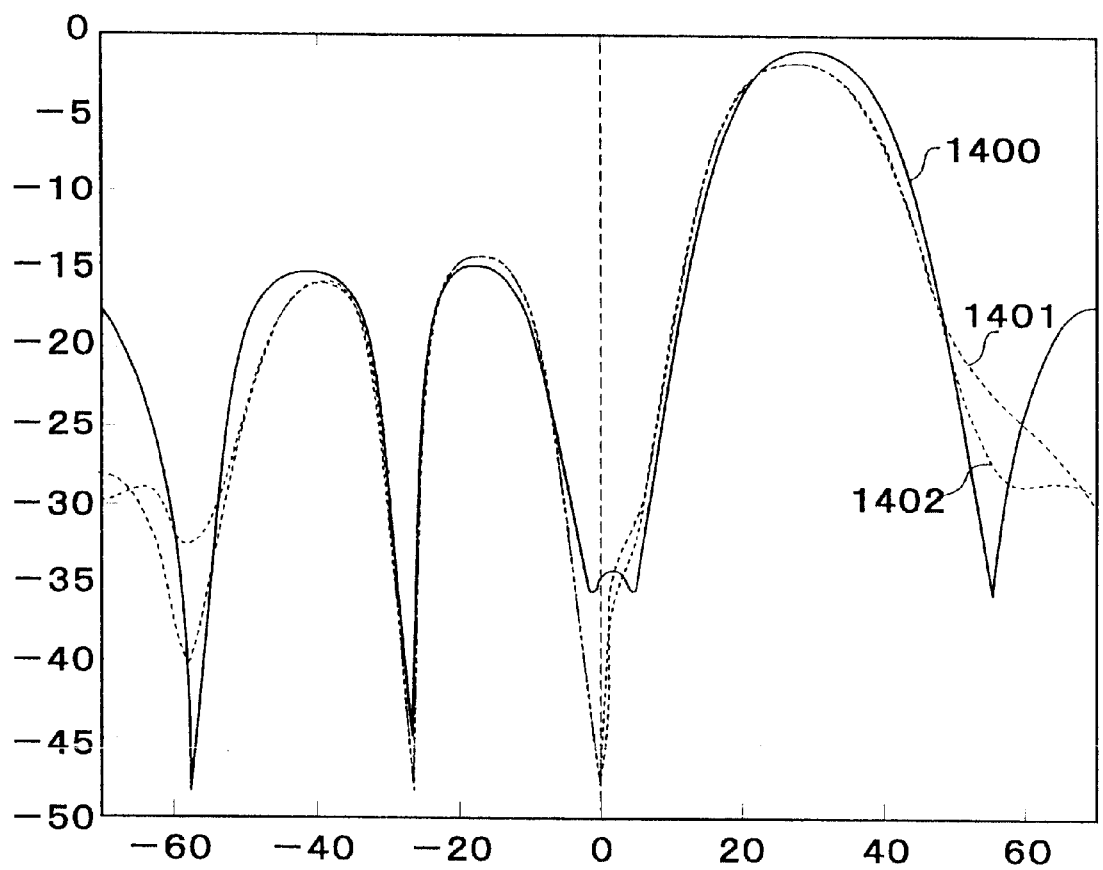
FIG. 14 is a radiation pattern diagram for use in the above fourth embodiment.

FIG. 14 is a radiation pattern diagram for use in the fourth embodiment. In FIG. 14, 1400 is a target pattern, 1401 is a transmission pattern subjected to transmission weight correction according to the fourth embodiment, and 1402 is a transmission pattern, subjected to the transmission weight correction, formed in the third embodiment (update only in one direction). In addition, it is assumed in this embodiment to use the reception pattern as target pattern 1400.

Characteristic operations of the fourth embodiment are explained below with reference to a flowchart illustrated in FIG. 15. In addition, it is assumed in the fourth embodiment that the angle range for the update is set at $-70° \leq \theta \leq 70°$.

In weight correction circuit 1201, first, target pattern forming circuit 1301 controlled by correction control circuit 1305 forms target pattern 1400 in the range of $-70° \leq \theta \leq 70°$ with reception weight Wr.

Figure 15:
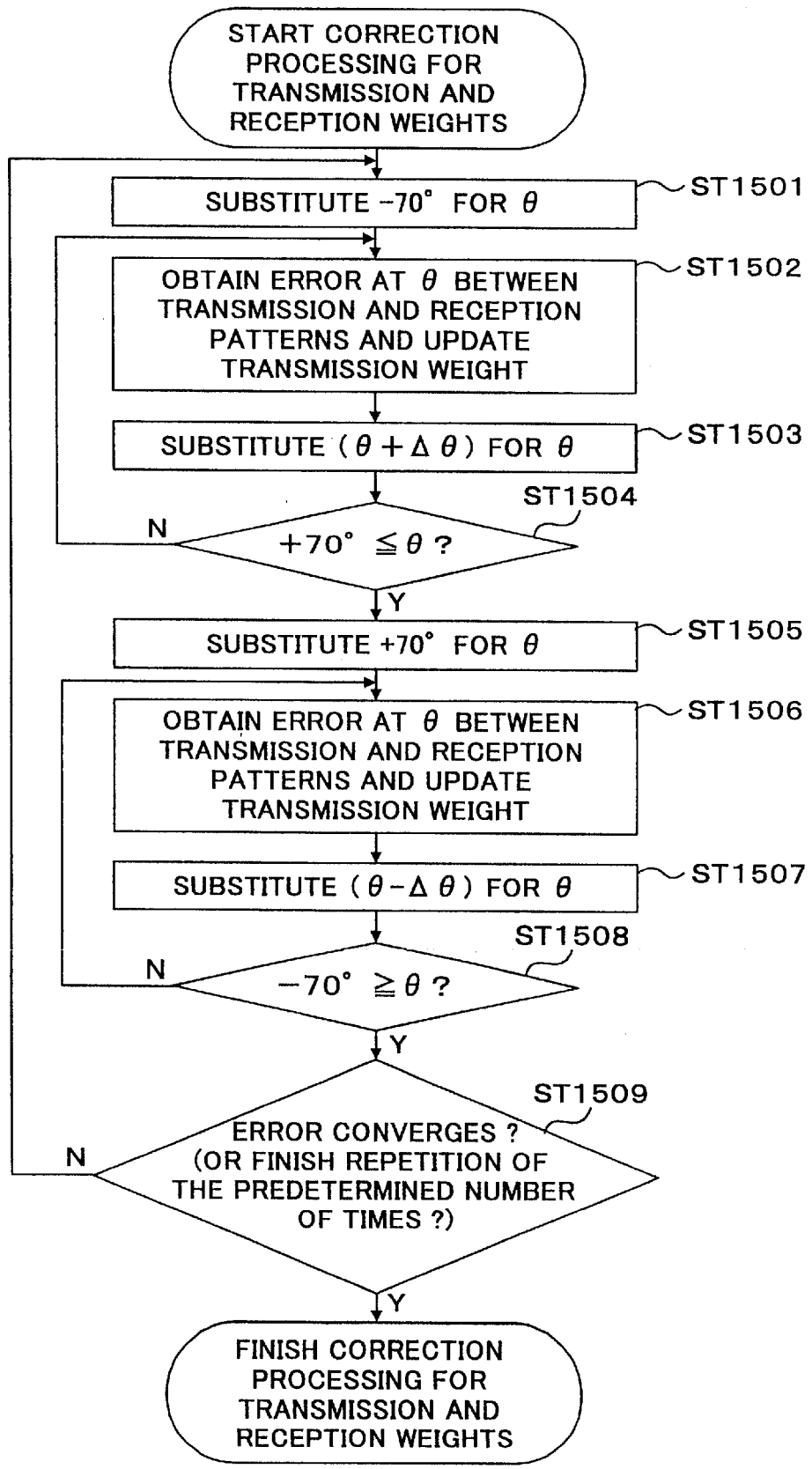
FIG. 15 is a flow chart to explain weight correction processing in the adaptive-directivity transmission apparatus according to the above fourth embodiment.

Next, in weight correction circuit 1201, the series of processing of the formation of transmission pattern 1401, error detection, and update of transmission weight Wt is executed according to the flowchart illustrated in FIG. 15.

Specifically, first, at step (hereinafter referred as "ST") 1501, correction control circuit 1305 substitutes $-70°$ for $\theta$, and transmission pattern forming circuit 1302 forms transmission pattern 1401 at −70°.

Next, at ST1502, error detection sect ion 1303 detects an error at −70° between target pattern 1400 and transmission pattern 1401, and based on the detected error, update section 1304 updates transmission weight Wt so as to reduce the error according to the predetermined algorithm.

Next, at ST1503, correction control circuit 1305 increases θ by an arbitrary angle interval (=Δθ).

Then, at ST1504, correction control circuit 1305 decides whether θ reaches the end of the angle range for the processing (70°), and when θ does not reach the end point, the processing flow returns to ST1502, and the processing of ST1502 to ST1504 is repeated. On the other hand, when θ reaches the end point, at ST1505, correction control circuit 1305 substitutes +70° for θ and transmission pattern forming circuit 1302 forms transmission pattern 1401 at +70°.

In other words, in weight correction circuit 1201, the series of processing of the formation of transmission pattern 1401, error detection, update of transmission weight Wt is sequentially executed repeatedly until θ reaches +70° starting from −70°, thus forming transmission pattern 1401 in the range of −70° to +70°.

Next, ST1506, error detection section 1303 detects an error at +70° between target pattern 1400 and transmission pattern 1401, and based on the detected error, update section 1304 updates transmission weight Wt so as to reduce the error according to the predetermined algorithm.

Next, at ST1507, correction control circuit 1305 decreases θ by an arbitrary angle interval (=Δθ).

Then, at ST1508, correction control circuit 1305 decides whether θ reaches the other end of the angle range for the processing (−70°), and when θ does not reach the other end point, the processing flow returns to ST1506, and the processing of ST1506 to ST1508 is repeated. On the other hand, when θ reaches the other end point, at ST1509, correction control circuit 1305 decides whether or not the error converges on a constant value. When the error does not converges on the constant value, the processing flow returns to ST1501 to repeat the processing of ST1501 to ST1509, and when the error converges on the constant value, the processing is finished.

Thus, according to the fourth embodiment, in the case where the angle range for the processing is limited to a half range or an arbitrary range, it is possible to reduce the deterioration of accuracy of radiation pattern approximation due to effects of discontinuity at the end points of the angle range for the processing.

In addition, in the fourth embodiment, although the angle range for the processing is set at $-70°≦θ≦70°$, and the starting point is set at −70°, it may be possible to employ any angle range and any starting point. Further, although the reception pattern is used as the target pattern, it may be possible to form a target pattern using reception weight Wr with the other algorithm. Furthermore, although reception weight Wr is used as an initial value of transmission weight Wt, it may be possible to use the other arbitrary values.

Fifth Embodiment

Figure 16:
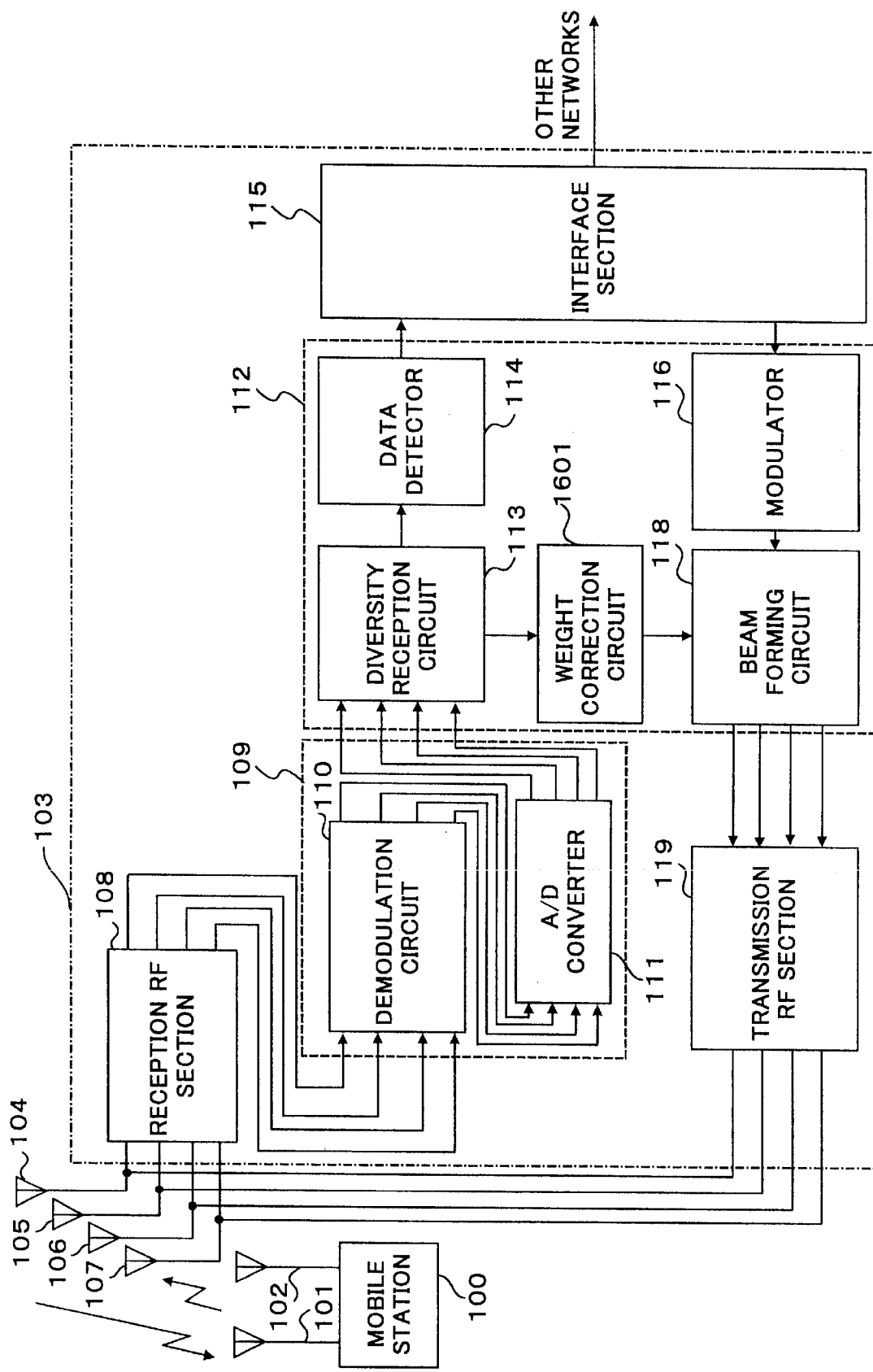
FIG. 16 is a block diagram illustrating a configuration of an adaptive-directivity transmission apparatus according to a fifth embodiment of the present invention.

FIG. 16 is a block diagram illustrating a configuration of an adaptive-directivity transmission apparatus according to the fifth embodiment of the present invention. In addition, in the fifth embodiment illustrated in FIG. 16, each section with the same configuration as that in the fourth embodiment illustrated in FIG. 12 is given the same symbol to omit explanations thereof.

The different point of the fifth embodiment illustrated in FIG. 16 from the fourth embodiment illustrated in FIG. 12 is that when weight correction circuit 1601 executes the series of processing of the formation of transmission pattern, error detection and update of transmission weight the predetermined number of times, or until the error converges on a constant value repeatedly at arbitrary angle intervals Δθ , weight correction circuit 1601 executes the processing shifting the angle at which the processing is executed, while holding angle interval Δθ, and interpolates further finely in angle interval Δθ, thus making it possible to reduce the calculation amount with the correction accuracy kept.

Figure 17:
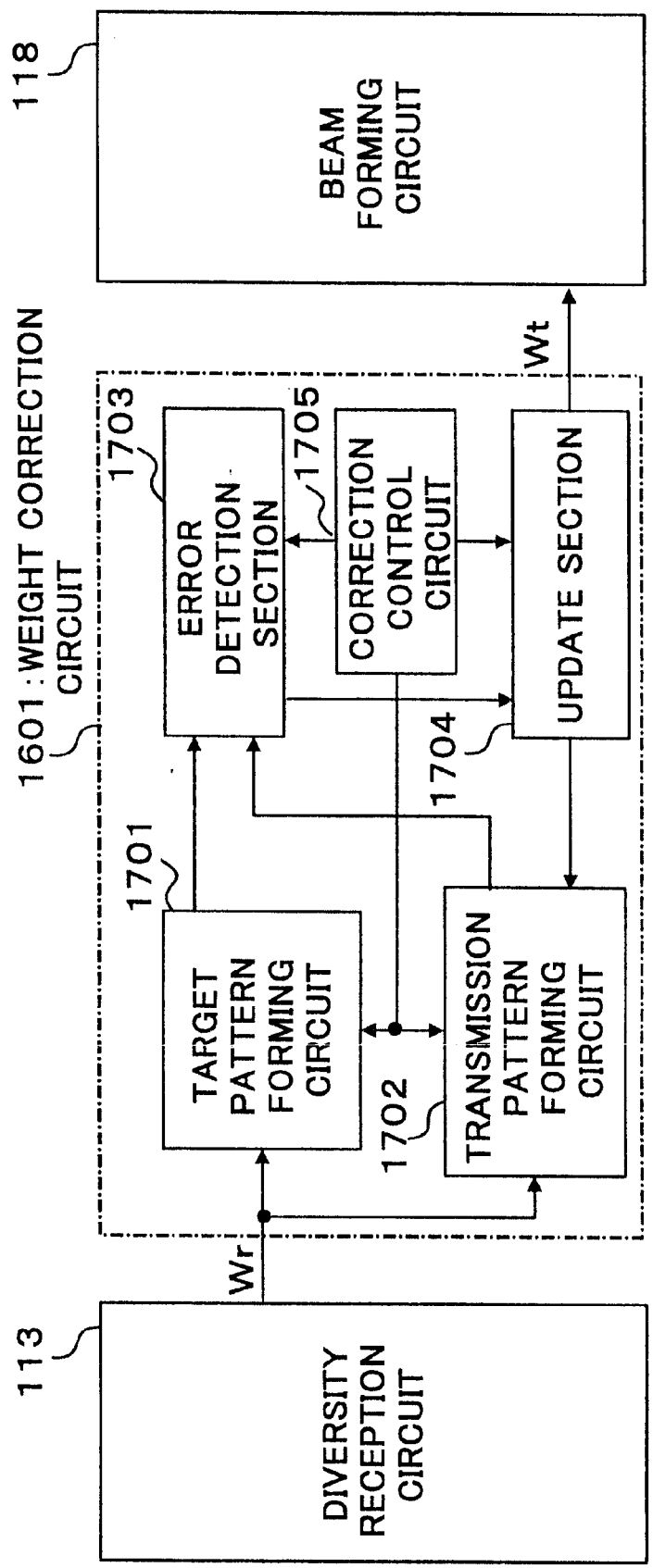
FIG. 17 is a block diagram illustrating a configuration of a weight correction circuit in the adaptive-directivity transmission apparatus according to the above fifth embodiment.

FIG. 17 is a block diagram illustrating a configuration of weight correction circuit 1601. As illustrated in FIG. 17, weight correction circuit 1601 is comprised of target pattern forming circuit 1701 which forms a target pattern based on reception weight Wr obtained in diversity reception circuit 113, transmission pattern forming circuit 1702 which forms a transmission pattern using transmission weight Wt, error detection section 1703 which detects an error between the target pattern and the transmission pattern, update section 1704 which updates transmission weight Wt so as to reduce the error, and correction control circuit 1705 which performs the control of an error detection range, and update range and update direction of transmission weight Wt.

Figure 18:
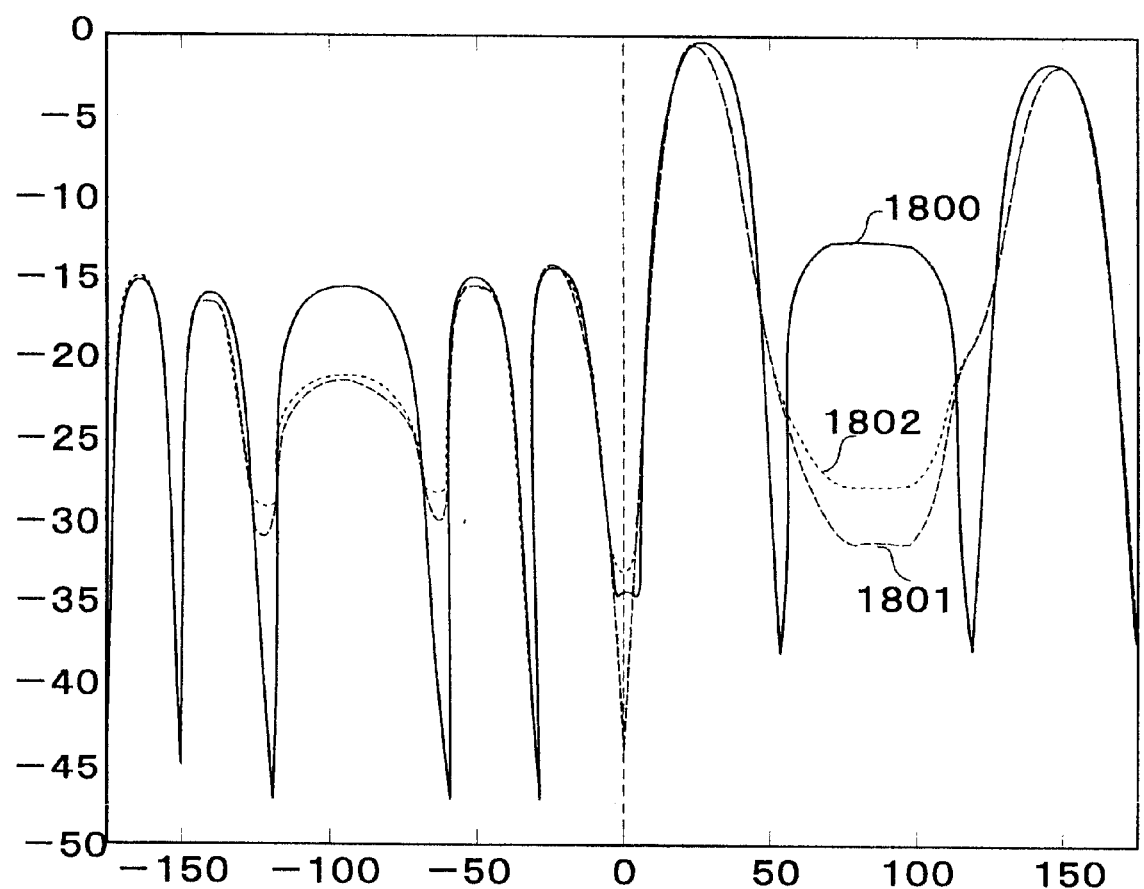
FIG. 18 is a radiation pattern diagram for use in the above fifth embodiment.

FIG. 18 is a radiation pattern diagram for use in the fifth embodiment. In FIG. 18, 1800 is a target pattern, 1801 is a transmission pattern subjected to transmission weight correction according to the fifth embodiment, and 1802 is a transmission pattern subjected to transmission weight correction at a fixed angle for the processing. In addition, it is assumed in this embodiment to use the reception pattern as target pattern 1800.

Characteristic operations of the fifth embodiment are explained below with reference to a flowchart illustrated in FIG. 19. In addition, it is assumed in the fifth embodiment that the angle range for the update is set at $0°≦θ≦360°$.

In weight correction circuit 1601, first, target pattern forming circuit 1701 controlled by correction control circuit 1705 forms target pattern 1800 in the range of $0°≦θ<360°$ with reception weight Wr.

Figure 19:
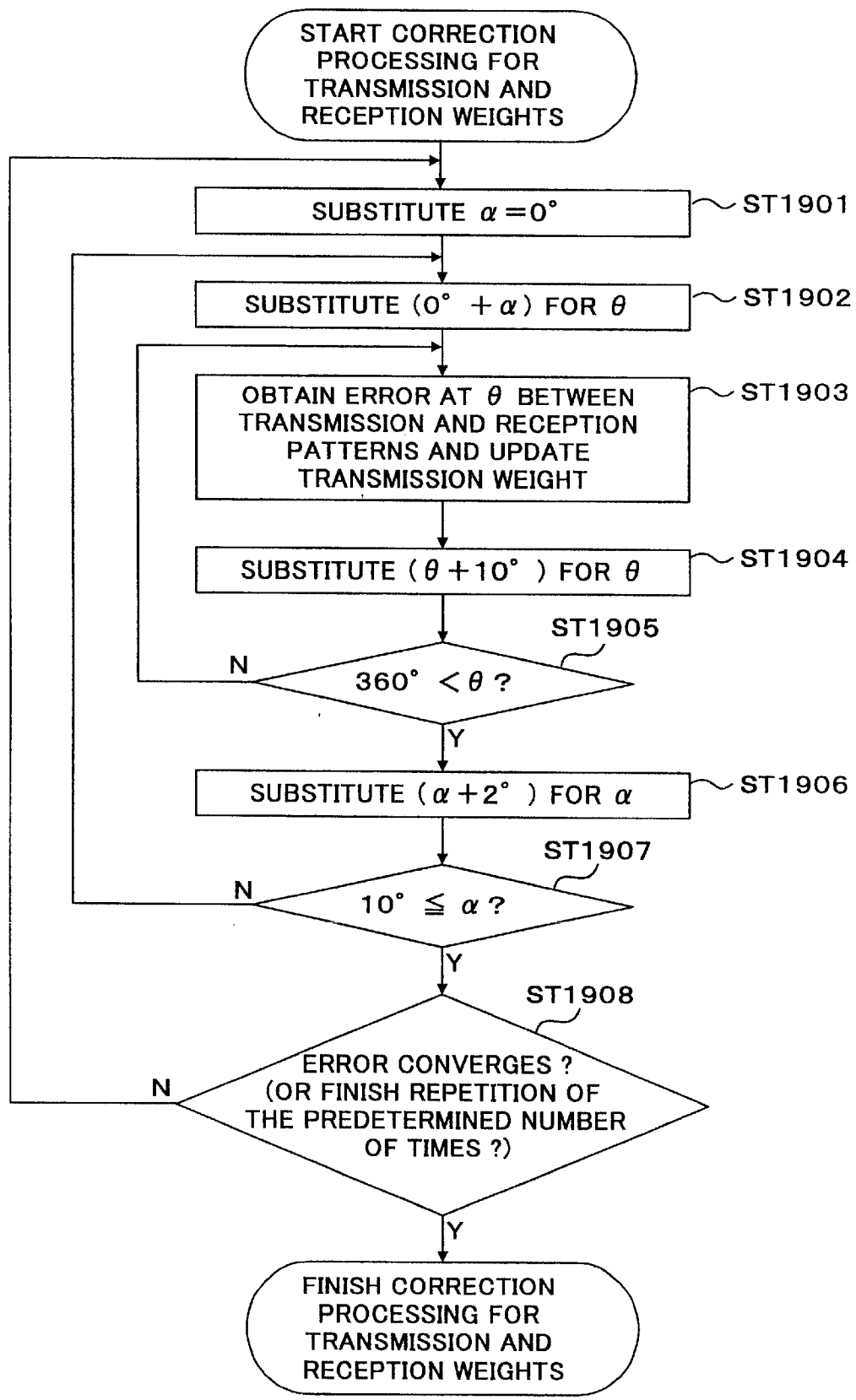
FIG. 19 is a flowchart to explain weight correction processing in the adaptive-directivity transmission apparatus according to the above fifth embodiment.

Next, in weight correction circuit 1601, the series of processing of the formation of transmission pattern 1801, error detection, and update of transmission weight Wt is executed according to the flowchart illustrated in FIG. 19.

Specifically, first, at ST1901, correction control circuit 1705 substitutes 0° for α that is a starting point of the above-mentioned series of processing.

Next, at ST1902, correction control circuit 1705 substitutes (0°+α) for θ , and transmission pattern forming circuit 1302 forms transmission pattern 1801 at 0°.

Next, at ST1903, error detection section 1703 detects an error at 0° between target pattern 1800 and transmission pattern 1801, and based on the detected error, update section 1704 updates transmission weight Wt so as to reduce the error according to the predetermined algorithm.

Next, at ST1904, correction control circuit 1705 increases θ by arbitrary angle interval Δθ(Δθ=10° in the fifth embodiment).

Then, at ST1905, correction control circuit 1705 decides whether θ exceeds 360° (360°<θ), and when θ does not exceed 360°, the processing flow returns to ST1903, and the processing of ST1903 to ST1905 is repeated. On the other hand, when 360°<θ, at ST1906, correction control circuit 1705 increases starting point α by Δα (Δα=2° in the fifth embodiment).

Next, at ST1907, correction control circuit 1705 decides whether starting point α reaches 10° (10°≦α), and when starting point α does not reach 10°, the processing flow returns to ST1902, and the processing of ST1902 to ST1907 is repeated. On the other hand, when 10°≦α, at ST1908, correction control circuit 1705 decides whether or not the error converges on a constant value. When the error does not converges on the constant value, the processing flow returns to ST1901, and the processing of ST1901 to ST1908 is repeated. When the error converges on the constant value, the processing is finished.

Thus, weight correction circuit 1601 executes the series of processing of the formation of transmission pattern 1801, error detection and update of transmission weight Wt to the other end shifting starting point α from 0° to 8° by Δα (Δα=2° in the fifth embodiment).

Thus, according to the fifth embodiment, it is possible to reduce the calculation amount with the converge rate increased, thereby making it possible to improve the accuracy for following changes of environments.

In addition, in the fifth embodiment, although the reception pattern is used as the target pattern, it may be possible to form a target pattern using reception weight Wr with the other algorithm. Further, although reception weight Wr is used as an initial value of transmission weight Wt, it may be possible to use the other arbitrary values.

As described above, according to the present invention, it is possible to handle a range of error variation due to the variation of directive antenna gain such as $10^{-n}$ time (n is an integer number) with high accuracy, thereby making it possible to improve the approximation of the directive antenna gain suppressed direction.

Further, it is possible to simplify the processing section for forming a target pattern, thereby making it possible to reduce the entire processing amount.

Furthermore, in the case where an arbitrary axis around which the radiation pattern forms mirror images is present in any direction within 360° in the directivity on a horizontal plane for an antenna, the error detection and update of transmission weight are executed in half the range of mirror images, and modified for 360° when the radiation pattern is formed. As a result, it is possible to reduce the calculation amount with the correction accuracy held at almost the same degree, as compared to the case where the error detection and update of transmission weight are executed in all directions.

Moreover, by using the directivities of sector antennas, and limiting the processing to be executed to the radiation pattern in a range close to that for reception to be executed, it is possible to further reduce the calculation amount as compared to the case where the processing is executed in a half of all directions (range of 180°).

Further, in the case where the angle range for the processing is limited to a half range or an arbitrary range, it is possible to reduce the deterioration of accuracy of radiation pattern approximation due to effects of discontinuity at the end points of the angle range for the processing.

Furthermore, it is possible to reduce the calculation amount with the converge rate increased, thereby making it possible to improve the accuracy for following changes of environments.

This application is based on the Japanese Patent Application No. HEI10-177525 filed on Jun. 24, 1998, entire content of which is expressly incorporated by reference herein.

Industrial Applicability

The present invention is applicable to, for example, a base station apparatus and mobile station apparatus in mobile communication systems.

What is claimed is:

1. An adaptive-directivity transmission apparatus comprising:
   a diversity receiver which estimates a reception weight using signals received at a plurality of antennas;
   a target pattern former which forms a target radiation pattern based on an estimated reception weight;
   a transmission pattern former which forms a transmission radiation pattern with a transmission weight using an arbitrary transmission weight as an initial value;
   a controller which limits an angle range in which formation of said target radiation pattern and formation of said transmission radiation pattern are executed;
   an error detector which detects an error between said target radiation pattern and said transmission radiation pattern;
   an updator which updates said transmission weight so as to reduce a detected error; and
   a directivity former which provides a transmission signal with a directivity according to said transmission radiation pattern formed using an updated transmission weight.

2. The adaptive-directivity transmission apparatus according to claim 1, wherein said error detector subjects the detected error to logarithmic transformation, and said updator updates the transmission weight so as to reduce said error subjected to the logarithmic transformation.

3. The adaptive-directivity transmission apparatus according to claim 1, wherein said target pattern former forms a reception radiation pattern with an estimated reception weight, and converts the reception radiation pattern into the target radiation pattern according to an arbitrary algorithm, thereby forming said target radiation pattern based on said estimated reception weight.

4. The adaptive-directivity transmission apparatus according to claim 1, wherein based on signal vectors for all directions obtained from signal incidence angles for a plurality of antenna configurations, said controller detects an angle range in which the target radiation pattern and transmission radiation pattern each forms mirror images, and limits the angle range in which the formation of said target radiation pattern and the formation of said transmission radiation pattern are executed.

5. The adaptive-directivity transmission apparatus according to claim 1, wherein in the case where the plurality of antennas are sector antennas, said controller sets an angle range corresponding to directivities of a plurality of sector antennas, and limits the angle range in which the formation of said target radiation pattern and the formation of said transmission radiation pattern are executed.

6. The adaptive-directivity transmission apparatus according to claim 1, wherein said controller limits an angle range in which the formation of said target radiation pattern and the formation of said transmission radiation pattern are executed, and increases an angle by a predetermined angle interval from a minimum angle to a maximum angle in a limited angle range, while decreasing the angle by said predetermined angle interval from said maximum angle to said minimum angle in said limited angle range.

7. The adaptive-directivity transmission apparatus according to claim 1, wherein said controller limits an angle range in which the formation of said target radiation pattern and the formation of said transmission radiation pattern are executed, and in a limited angle range, shifts a starting angle from which limitation is started to other arbitrary points sequentially, and increases an angle by a predetermined angle interval from said starting angle from which the limitation is started to a maximum angle for the limitation.

8. A base station apparatus provided with an adaptive-directivity transmission apparatus, said adaptive-directivity transmission apparatus comprising:

a diversity receiver which estimates a reception weight using signals received at a plurality of antennas;

a target pattern former which forms a target radiation pattern based on an estimated reception weight;

a transmission pattern former which forms a transmission radiation pattern with a transmission weight using an arbitrary transmission weight as an initial value;

a controller which limits an angle range in which formation of said target radiation pattern and formation of said transmission radiation pattern are executed;

an error detector which detects an error between said target radiation pattern and said transmission radiation pattern;

an updator which updates said transmission weight so as to reduce a detected error; and a directivity former which provides a transmission signal with a directivity according to said transmission radiation pattern formed using an updated transmission weight.

9. A mobile station apparatus provided with an adaptive-directivity transmission apparatus, said adaptive-directivity transmission apparatus comprising:

a diversity receiver which estimates a reception weight using signals received at a plurality of antennas;

a target pattern former which forms a target radiation pattern based on an estimated reception weight;

a transmission pattern former which forms a transmission radiation pattern with a transmission weight using an arbitrary transmission weight as an initial value;

a controller which limits an angle range in which formation of said target radiation pattern and formation of said transmission radiation pattern are executed;

an error detector which detects an error between said target radiation pattern and said transmission radiation pattern;

an updator which updates said transmission weight so as to reduce a detected error; and a directivity former which provides a transmission signal with a directivity according to said transmission radiation pattern formed using an updated transmission weight.

10. A mobile communication system having a base station apparatus provided with an adaptive-directivity transmission apparatus and a mobile station apparatus provided with the adaptive-directivity transmission apparatus, said adaptive-directivity transmission apparatus comprising:

a diversity receiver which estimates a reception weight using signals received at a plurality of antennas;

a target pattern former which forms a target radiation pattern based on an estimated reception weight;

a transmission pattern former which forms a transmission radiation pattern with a transmission weight using an arbitrary transmission weight as an initial value;

a controller which limits an angle range in which formation of said target radiation pattern and formation of said transmission radiation pattern are executed;

an error detector which detects an error between said target radiation pattern and said transmission radiation pattern;

an updator which updates said transmission weight so as to reduce a detected error; and a directivity former which provides a transmission signal with a directivity according to said transmission radiation pattern formed using an updated transmission weight.

11. An adaptive-directivity transmission method comprising:

the diversity receiving step of estimating a reception weight using signals received at a plurality of antennas;

the target pattern forming step of forming a target radiation pattern based on an estimated reception weight;

the transmission pattern forming step of forming a transmission radiation pattern with a transmission weight using an arbitrary transmission weight as an initial value;

the control step of limiting an angle range in which formation of said target radiation pattern and formation of said transmission radiation pattern are executed;

the error detection step of detecting an error between said target radiation pattern and said transmission radiation pattern;

the update step of updating said transmission weight so as to reduce a detected error; and the beam forming step of providing a transmission signal with a directivity according to said transmission radiation pattern formed using an updated transmission weight.

12. The adaptive-directivity transmission method according to claim 11, wherein in said error detection step, the detected error is subjected to logarithmic transformation, and in said update step, the transmission weight is updated so that said error subjected to the logarithmic transformation is reduced.

13. The adaptive-directivity transmission method according to claim 11, wherein in said target pattern forming step, a reception radiation pattern is formed using an estimated reception weight, and the reception radiation pattern is converted into the target radiation pattern according to an arbitrary algorithm, whereby said target radiation pattern is formed based on said estimated reception weight.

* * * * *